United States Patent
Lee

(10) Patent No.: US 11,463,244 B2
(45) Date of Patent: Oct. 4, 2022

(54) ELECTRONIC APPARATUS, METHOD OF CONTROLLING THE SAME, AND NETWORK SYSTEM THEREOF

(71) Applicant: SAMSUNG ELECTRONICS CO., LTD., Suwon-si (KR)

(72) Inventor: Sang Gyu Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 330 days.

(21) Appl. No.: 16/739,899

(22) Filed: Jan. 10, 2020

(65) Prior Publication Data
US 2020/0228329 A1  Jul. 16, 2020

(30) Foreign Application Priority Data

Jan. 10, 2019 (KR) .................. 10-2019-0003032

(51) Int. Cl.
*H04L 29/06* (2006.01)
*H04L 9/08* (2006.01)
*H04L 9/14* (2006.01)

(52) U.S. Cl.
CPC .......... *H04L 9/0861* (2013.01); *H04L 9/0822* (2013.01); *H04L 9/0825* (2013.01); *H04L 9/14* (2013.01)

(58) Field of Classification Search
CPC ... H04L 9/0861; H04L 9/0822; H04L 9/0825; H04L 9/14; H04L 2209/805; H04L 9/0897; H04L 9/0827; H04L 9/085; H04L 67/2809

See application file for complete search history.

(56) References Cited

U.S. PATENT DOCUMENTS

| | | | | |
|---|---|---|---|---|
| 4,941,176 A * | 7/1990 | Matyas | ............... | G06F 9/30018 712/E9.032 |
| 5,164,988 A * | 11/1992 | Matyas | ................... | H04L 9/088 713/156 |
| 6,047,072 A * | 4/2000 | Field | ..................... | H04L 9/0825 380/283 |
| 8,316,237 B1 * | 11/2012 | Felsher | ................. | H04L 9/3249 380/282 |
| 10,742,611 B2 * | 8/2020 | Naylor | .................. | H04L 9/0822 |

(Continued)

FOREIGN PATENT DOCUMENTS

| | | | | |
|---|---|---|---|---|
| CN | 109302281 B | * | 12/2021 | ............. G06Q 50/01 |
| EP | 3051744 A1 | * | 8/2016 | ........... H04L 63/061 |

(Continued)

OTHER PUBLICATIONS

Menezes et al., "Handbook of Applied Cryptography", CRC Press, 1996 (Year: 1996).*

*Primary Examiner* — John B King
(74) *Attorney, Agent, or Firm* — Sughrue Mion, PLLC

(57) ABSTRACT

An electronic apparatus includes: a communicator configured to communicate with an intermediate server and an other electronic apparatus; a memory in which an encryption key and a decryption key generated by the electronic apparatus are stored; and a controller configured to transmit the encryption key generated by the electronic apparatus to the other electronic apparatus through the intermediate server and performs control such that a network with the other electronic apparatus is formed.

12 Claims, 12 Drawing Sheets

(56) References Cited

U.S. PATENT DOCUMENTS

| | | | | |
|---|---|---|---|---|
| 2002/0199102 A1* | 12/2002 | Carman | ............... | H04L 9/083 713/168 |
| 2003/0149874 A1* | 8/2003 | Balfanz | ............... | H04L 69/168 713/168 |
| 2004/0083368 A1* | 4/2004 | Gehrmann | ............ | H04L 9/3242 713/171 |
| 2007/0186105 A1* | 8/2007 | Bailey | ................ | H04L 9/0861 713/168 |
| 2007/0223703 A1* | 9/2007 | Verma | ................ | H04L 9/0833 380/278 |
| 2008/0137859 A1 | 6/2008 | Jagadeesan et al. | | |
| 2013/0262856 A1* | 10/2013 | Moshfeghi | ......... | H04L 63/0876 713/155 |
| 2014/0317409 A1* | 10/2014 | Bartok | ............... | H04L 63/06 713/171 |
| 2014/0344575 A1* | 11/2014 | Saremi | ............... | H04L 63/061 713/168 |
| 2014/0365775 A1* | 12/2014 | Yavuz | ................ | H04L 9/3297 713/171 |
| 2015/0271667 A1* | 9/2015 | Bernsen | ............ | H04W 12/0431 713/171 |
| 2016/0112396 A1* | 4/2016 | Paya | ................. | H04L 9/321 713/156 |
| 2016/0344725 A1* | 11/2016 | Severin | ............. | H04L 63/0442 |
| 2018/0176194 A1* | 6/2018 | Xiong | ............... | H04W 12/041 |
| 2018/0357432 A1* | 12/2018 | Tang | ................ | H04L 9/0822 |
| 2019/0104472 A1* | 4/2019 | Teboulle | ............ | H04W 8/005 |
| 2019/0361917 A1* | 11/2019 | Tran | ................. | G06Q 40/04 |
| 2020/0074464 A1* | 3/2020 | Trevethan | ......... | H04L 9/0637 |
| 2021/0243599 A1* | 8/2021 | Lee | .................. | H04L 9/30 |

FOREIGN PATENT DOCUMENTS

| | | | | |
|---|---|---|---|---|
| GB | 2375011 A | * | 10/2002 | ............ H04L 29/06 |
| JP | 2001209306 A | * | 8/2001 | ............ G06F 12/14 |
| WO | WO-0103017 A1 | * | 1/2001 | ............ G06Q 10/10 |
| WO | WO-2017210852 A1 | * | 12/2017 | ......... H04L 63/306 |
| WO | WO-2018207174 A1 | * | 11/2018 | |

* cited by examiner

ELECTRONIC APPARATUS, METHOD OF CONTROLLING THE SAME, AND NETWORK SYSTEM THEREOF

CROSS-REFERENCE TO RELATED APPLICATION(S)

This application is based on and claims priority under 35 U.S.C. § 119 to Korean Patent Application No. 10-2019-0003032, filed on Jan. 10, 2019 in the Korean Intellectual Property Office, the disclosure of which is incorporated by reference herein in its entirety.

BACKGROUND

1. Field

The disclosure relates to an electronic apparatus, a method of controlling the same, and a network system thereof, which are capable of safely transmitting and receiving data through a network between electronic apparatuses.

2. Description of the Related Art

The Internet of Things (IoT) refers to an environment in which various devices in daily lives are connected to wired or wireless networks to share various types of information. In this case, the apparatus shares various types of information through the wired or wireless networks may be referred to as an electronic apparatus. In particular, a technology for monitoring and managing various electronic apparatuses existing indoors through IoT is referred to as a smart home technology.

Meanwhile, in the IoT technology, various apparatuses may form a network by transmitting and receiving encryption keys therebetween. However, since the encryption key is transmitted through the network, there is a vulnerability that an attacker may manipulate the encryption key and solve the ciphertext.

In order to remove such a limitation, a certificate chain technology and a technology for verifying a public key fingerprint directly by the user have been proposed. However, such technologies cause a hassle in individually issuing a certificate and manually identifying the certificate on the user side. Accordingly, there is an increasing need for a network system capable of removing the above-discussed limitations and having a high security.

SUMMARY

Embodiments provide an electronic apparatus, a method of controlling the same, and a network system thereof that are capable of safely transmitting and receiving data by forming a network between electronic apparatuses through an intermediate server.

Additional aspects of the disclosure will be set forth in part in the description which follows and, in part, will be obvious from the description, or may be learned by practice of the disclosure.

In accordance with an aspect of the disclosure, there is provided an electronic apparatus including: a communicator configured to communicate with an intermediate server and another electronic apparatus; a memory in which an encryption key and a decryption key generated by the electronic apparatus are stored; and a controller configured to transmit the encryption key generated by the electronic apparatus to the other electronic apparatus through the intermediate server and performs control such that a network with the other electronic apparatus is formed.

The memory may store an intermediate encryption key corresponding to the intermediate server, wherein the controller may encrypt the encryption key generated by the electronic apparatus using the intermediate encryption key and transmit the encrypted encryption key to the other electronic apparatus.

The communicator may receive an encryption key generated by the other electronic apparatus from the intermediate server in a decrypted state.

The communicator may receive an encryption key generated by the other electronic apparatus, and the controller may perform control such that the network with the other electronic apparatus is formed on the basis of the encryption key generated by the other electronic apparatus and the encryption key generated by the electronic apparatus and stored in the memory.

The controller may encrypt data using the encryption key generated by the other electronic apparatus and may transmit the encrypted data to the other electronic apparatus through the communicator.

The communicator may receive data encrypted using the encryption key generated by the electronic apparatus from the other electronic apparatus, and the controller may decrypt the encrypted data using the decryption key.

In accordance with an aspect of the disclosure, there is provided a method of controlling an electronic apparatus, the method including: storing an encryption key and a decryption key generated by the electronic apparatus; transmitting the encryption key generated by the electronic apparatus to the other electronic apparatus through an intermediate server; and performing control such that a network with the other electronic apparatus is formed.

The method may further include: storing an intermediate encryption key corresponding to the intermediate server, wherein the transmitting of the encryption key generated by the electronic apparatus includes encrypting the encryption key generated by the electronic apparatus using the intermediate encryption key and transmitting the encrypted encryption key to the other electronic apparatus.

The method may further include receiving an encryption key generated by the other electronic apparatus from the intermediate server in a decrypted state.

The method may further include receiving an encryption key generated by the other electronic apparatus, wherein the performing of control such that the network with the other electronic apparatus is formed may include performing control such that the network with the other electronic apparatus is formed by comparing the encryption key generated by the other electronic apparatus with the encryption key generated by the electronic apparatus and stored in the memory.

The method may further include: encrypting data using the encryption key generated by the other electronic apparatus: and transmitting the encrypted data to the other electronic apparatus through a communicator.

The method may further include: receiving data encrypted using the encryption key generated by the electronic apparatus from the other electronic apparatus; and decrypting the encrypted data using the decryption key.

In accordance with an aspect of the disclosure, there is provided a network system including: an intermediate server; a first electronic apparatus in which an intermediate encryption key corresponding to the intermediate server is stored; and a second electronic apparatus in which the intermediate encryption key is stored, and configured to transmit an encryption key generated by the second electronic apparatus to the first electronic apparatus through the intermediate server to form a network with the first electronic apparatus.

The second electronic apparatus may encrypt the encryption key generated by the second electronic apparatus using the intermediate encryption key and transmit the encrypted encryption key.

The intermediates server may decrypt the encrypted encryption key generated by the second electronic apparatus and transmit the decrypted encryption key to the first electronic apparatus.

The second electronic apparatus may form the network with the first electronic apparatus based on receiving an encryption key generated by the first electronic apparatus.

The first electronic apparatus may encrypt data using the encryption key generated by the second electronic apparatus and transmit the encrypted data to the second electronic apparatus.

The second electronic apparatus may decrypt the encrypted data using a decryption key.

BRIEF DESCRIPTION OF THE DRAWINGS

The above and other aspects, features, and advantages of certain embodiments of the present disclosure will be more apparent from the following description, taken in conjunction with the accompanying drawings, in which.

DETAILED DESCRIPTION

Figure 1:
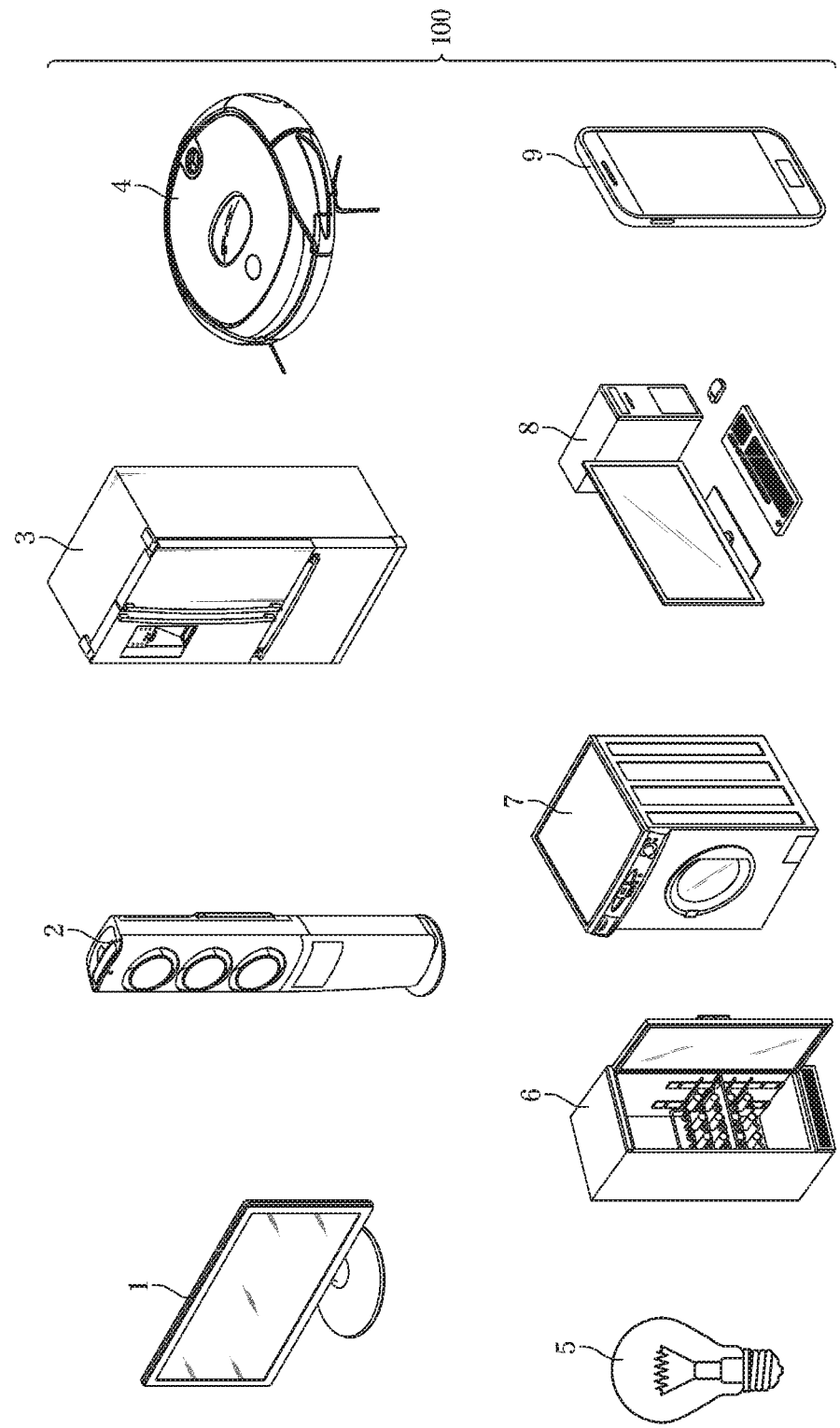
FIG. 1 is a diagram for describing various types of electronic apparatuses according to an embodiment.

Like numerals refer to like elements throughout the specification. Not all elements of embodiments of the disclosure will be described, and description of what are commonly known in the art or what overlap each other in the embodiments will be omitted. The terms as used throughout the specification, such as "~ part", "~ module", "~ member", "~ block", etc., may be implemented in software and/or hardware, and a plurality of "~ parts", "~ modules", "~ members", or "~ blocks" may be implemented in a single element, or a single "~ part", "~ module", "~ member", or "~ block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, Further, when it is stated that one member is "on" another member, the member may be directly on the other member or a third member may be disposed therebetween.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the principles and embodiments of the disclosure will be described with reference to the accompanying drawings.

FIG. 1 is a diagram for describing various types of electronic apparatuses according to an embodiment.

Figure 2:
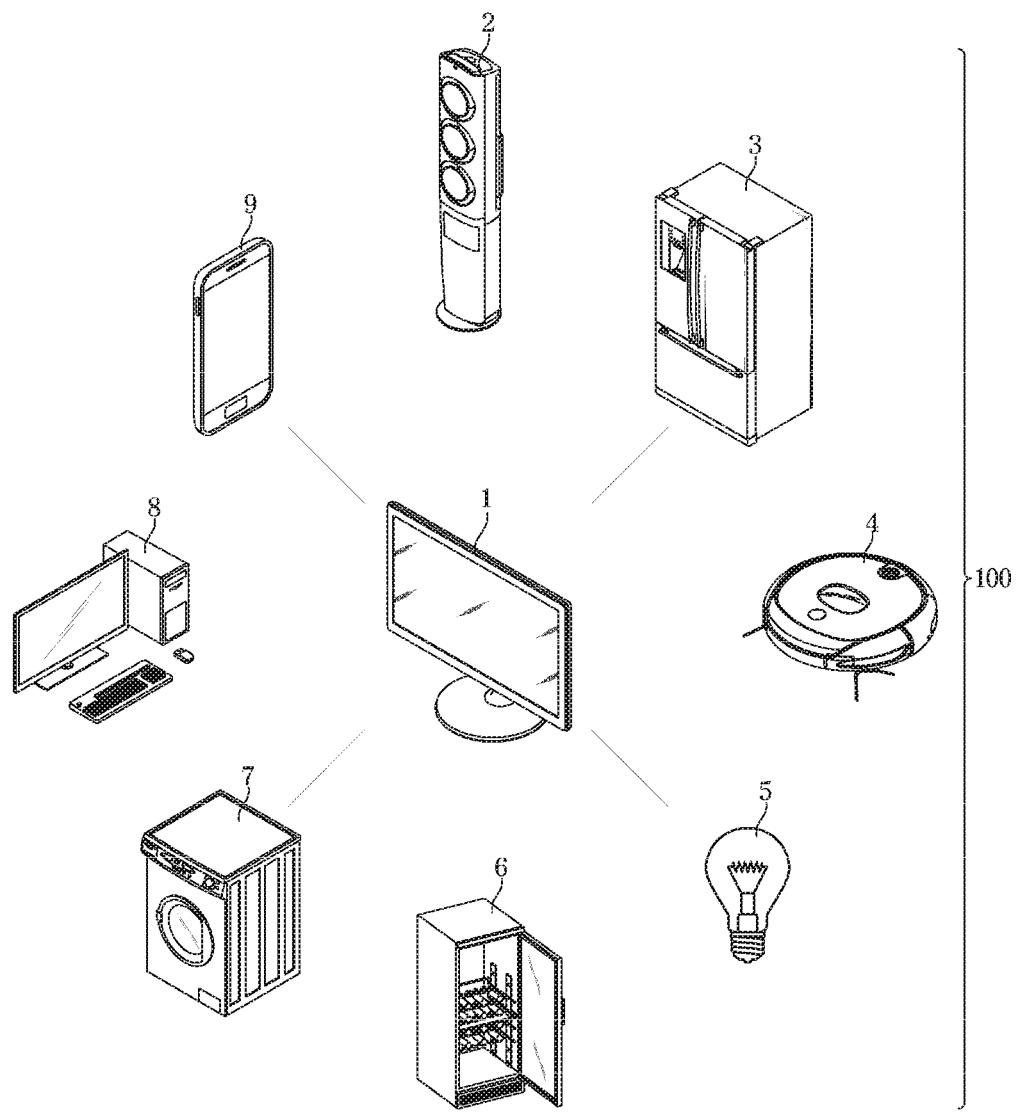
FIG. 2 is a diagram for describing a display apparatus as an example of an electronic apparatus according to an embodiment, which serves as a home hub.

FIG. 2 is a diagram for describing a display apparatus as an example of one of electronic apparatuses 100 according to an embodiment, which serves as a home hub.

The electronic apparatus refers to various devices existing in a daily life, that is, devices that may access a home network through a communicator 170 built in the device and transmit and receive data therebetween.

For example, referring to FIG. 1, the electronic apparatus may include home appliances, such as a display apparatus 1, an air conditioner 2, a refrigerator 3, a cleaning robot 4, a lighting apparatus 5, a wine refrigerator 6, a washing machine 7, and a desktop computer 8, and wearable user terminals, such as a smartphone 9, a smart watch, and smart glasses.

Here, the home network refers to a network that provides a passage through which data may be exchanged with all the electronic apparatuses indoors and at the same time, provides a passage for connecting to an external Internet network.

The home network may be collectively managed by a gateway server. In detail, the gateway server of the home network is a server configured to collectively manage the home network, and the operation of the gateway server may be performed by one of the electronic apparatuses or another server that exists separately. In other words, any one of the electronic apparatuses may serve as a home hub.

For example, referring to FIG. 2, the display apparatus 1, which is one of IoT devices, may serve as a home hub to exchange data with other IOT devices.

In order to serve as a home hub, an interaction with the user is important. When the display apparatus 1 serves as a home hub, the user is easily provided with information related to other electronic apparatus through a display, so that the need to additionally install a display on the apparatus is obviated.

In addition, since the display apparatus 1 is provided with an input, such as a touch screen type display, a remote controller, a button, or the like, various control commands may be easily received from the user.

The following description will be made in relation to the display apparatus 1 as an example of the electronic apparatuses, but the electronic apparatus according to the disclosure is not limited thereto and may be variously provided as long as it can provide various types of information to a user through a display and include a built-in processor for controlling the operation of the display.

The display apparatus 1, when an event occurs in the electronic apparatus, may receive event information and provide the event information to a user. In addition, the display apparatus 1 may receive various control commands from a user and perform control on the electronic apparatus on the basis of the received control commands.

In this case, data may be exchanged between the display apparatus 1 and IOT devices through various communication methods, but when all communication modules supporting the various communication methods are built in the display apparatus 1, the display apparatus 1 may have a great load, resulting in performance degradation.

Figure 3:
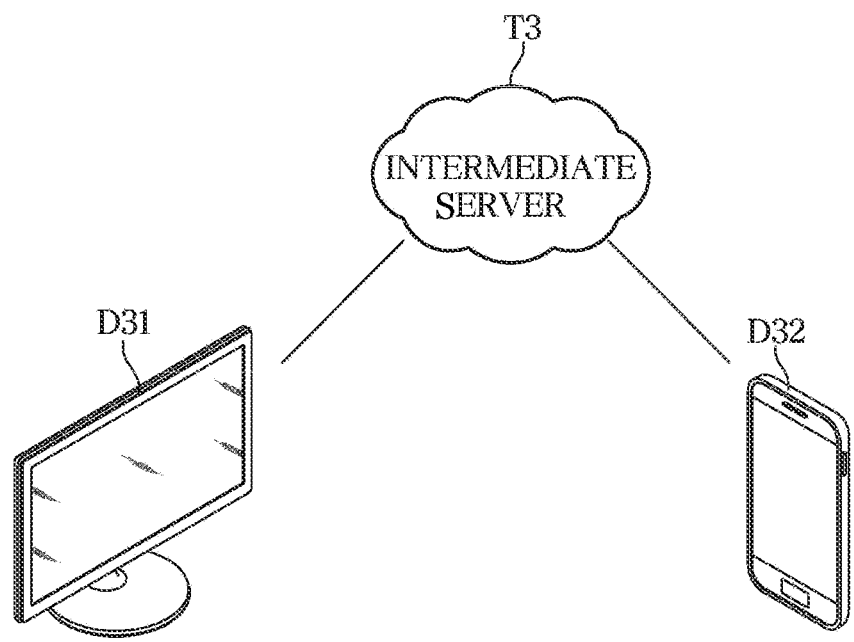
FIG. 3 is a schematic view illustrating an operation of forming a network between electronic apparatuses according to an embodiment.

FIG. 3 is a schematic view showing an operation of forming a network between electronic apparatuses according to an embodiment.

Referring to FIG. 3, electronic apparatuses D31 and D32 (first and second electronic apparatuses D31 and D32) may form an IoT network by directly communicating with each other, or may form an IoT network through an intermediate server T3.

The intermediate server T3 may be implemented as a gateway server. The gateway server may be provided in the form of a cloud in which data is stored in a central computer connected to the Internet such that the data is useable by simply accessing the Internet.

When the network between the electronic apparatuses D31 and D32 is formed by directly communication between the electronic apparatuses D31 and D32, an attacker may exist between the electronic apparatuses D31 and D32. In this case, the attacker may obtain data transmitted between the electronic apparatuses D31 and D32.

The electronic apparatuses D31 and D32 may transmit encryption keys to the intermediate server T3 having an intermediate encryption key.

The intermediate encryption key may refer to an encryption key stored in the intermediate server and the electronic apparatuses in common when the electronic apparatuses are manufactured.

The encryption key may refer to an encryption key that is uniquely generated by each of the electronic apparatuses. The intermediate encryption key may refer to an encryption key commonly stored in each electronic apparatus and an intermediate server, and also refer to an encryption key capable of encrypting an encryption key generated individually by the electronic apparatus. The intermediate server T3 may transmit an encryption key of the first electronic apparatus d31 to the second electronic apparatus d32 in which the intermediate encryption key is stored in advance. As such, the electronic apparatuses and the intermediate server may store the intermediate encryption key in advance. The electronic apparatus may encrypt the encryption key generated by the electronic apparatus on the basis of the previously stored intermediate encryption key. The intermediate server may decrypt the encryption key of the electronic apparatus, which is encrypted using the intermediate encryption key, on the basis of the previously stored intermediate encryption key.

Detailed operation thereof will be described below.

Figure 4:
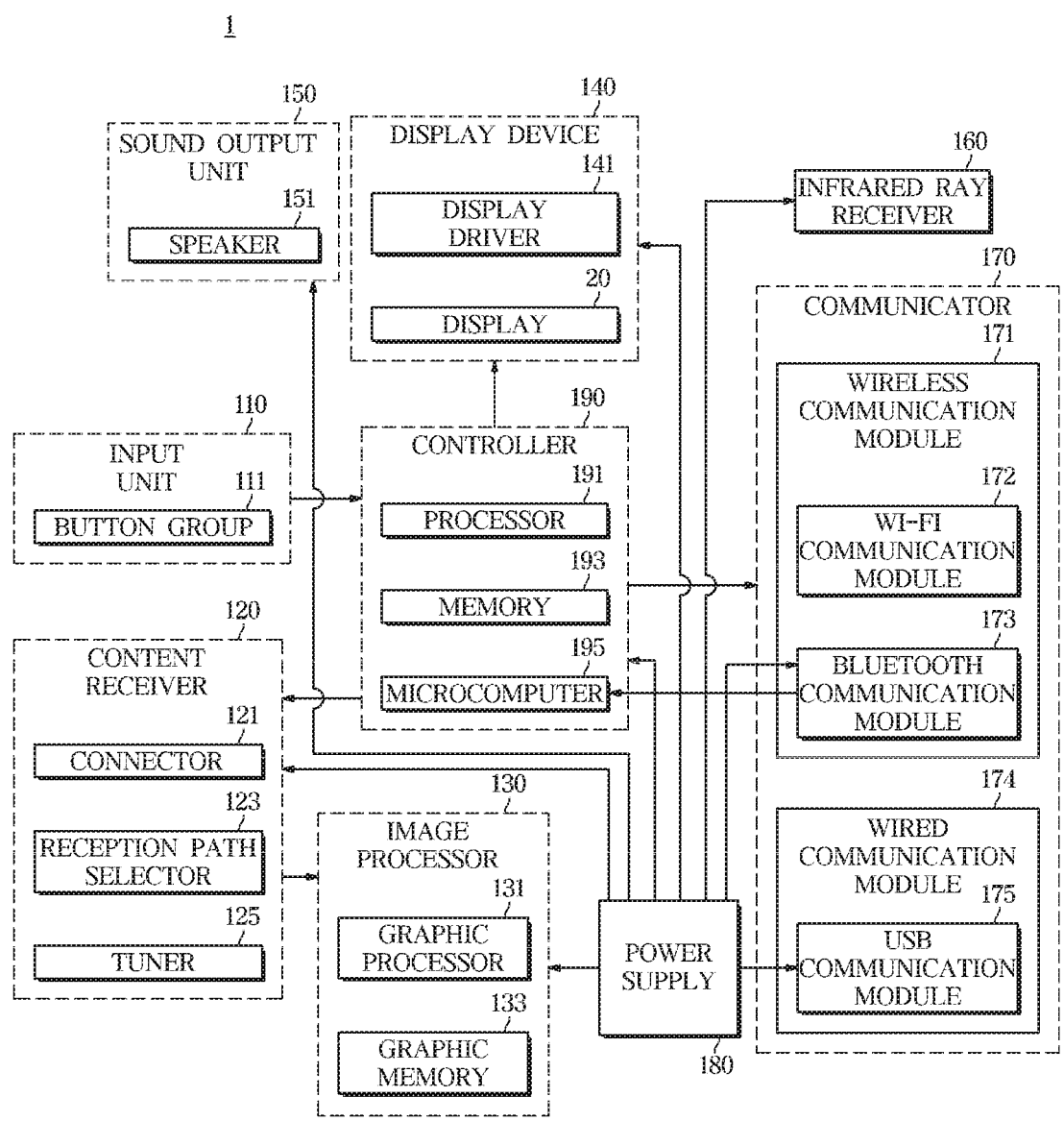
FIG. 4 is a control block diagram illustrating an electronic apparatus according to an embodiment.

FIG. 4 is a control block diagram illustrating an electronic apparatus according to an embodiment.

The display apparatus 1, which is an example of an electronic apparatus, is an apparatus capable of processing an image signal received from the outside and visually displaying the processed image. For example, the display apparatus 1 may be implemented in various forms, such as a monitor, a portable multimedia device, and the like, as long as it can visually displays an image.

The display apparatus 1 may include a main body 10 that forms the external appearance of the display apparatus 1 and accommodates various components constituting the display apparatus 1, and a display 20 that displays an image to a user.

Meanwhile, the display apparatus 1 may be implemented as a stand type or a wall-mounted type according to a supporting method. According to one embodiment, the main body 10 may be implemented as a wall-mounted type installed on a vertical surface, such as a wall surface, through a bracket or the like. According to another embodiment, the main body 10 may be provided at a lower side thereof with a stand for supporting the main body 10. The main body 10 may be stably disposed on a flat surface by the stand.

The main body 10 may be provided at a front surface thereof with a button group for receiving various control commands from the user and a display for displaying an image according to the user control command.

In addition, various components for realizing the functions of the display apparatus 1 may be provided inside the main body 10. Hereinafter, a control block diagram of the display apparatus 1 will be described.

Referring to FIG. 4, the display apparatus 1 includes an input unit 110 that receives a control command from a user, a content receiver 120 that receives content including an image and sound from an external apparatus, an image processor 130 that processes image data included in the content, a display device 140 that displays an image corresponding to the image data included in the content, a sound output unit 150 that outputs sound corresponding to sound data included in the content, and a controller 190 that controls the overall operation of the display apparatus 1.

Here, the input unit 110 may include a button group 111 that receives various control commands from the user. For example, the button group 111 may include a volume button for adjusting the volume of the sound output from the sound output unit 150, a channel button for changing a communication channel received by the content receiver 120, and a power button for turning on/off the power of the display apparatus 1. In addition, the input unit 110 may be variously provided as long as it can receive various control commands related to operations of the display apparatus 1 and the IoT devices through the button group 111 described above.

Meanwhile, the various buttons included in the button group 111 may be provided using a push switch and a membrane switch that sense the pressing operation of the user, or a touch switch that senses the contact of a body part of a user. However, the disclosure is not limited thereto, and the button group 111 may employ various input methods capable of outputting an electrical signal in response to a specific motion of the user.

In addition, the input unit 110 may include a remote controller that receives a control command from a user at a remote site and transmits the received user control command to the display apparatus 1. In addition, the input unit 110 includes various known components capable of receiving a control command from a user. In addition, when the display 20 is implemented as a touch screen type display, the display 20 may perform the function of the input unit 110.

For example, the input unit 110 may receive a control command regarding an IoT device from a user through the button group 111, the remote controller, or the touch screen type display described above. Accordingly, the input unit 110 may transmit the control command regarding the IoT device to the controller 190 through a control signal.

The content receiver 120 may receive various types of content from various external apparatuses. For example, the content receiver 120 may receive content from an antenna that receives a broadcast signal wirelessly, a set top box that receives a broadcast signal wirelessly or wirelessly and properly converts the received broadcast signal, and a multimedia playback apparatus (for example, a DVD player, a CD player, a Blu-ray player, etc.) that reproduces content stored in a multimedia storage medium.

In detail, the content receiver 120 includes a connector or connectors 121 connected to an external apparatus, a reception path selector 123 for selecting a path through which content is received among the plurality of connectors 121, a tuner 135 for selecting a channel (or frequency) through which a broadcast signal is received when receiving broadcasting signals, and the like.

The connector 121 may include a coaxial cable connector (an RF coaxial cable connector) for receiving a broadcast signal including content from the antenna, a high definition multimedia interface (HDMI) connector for receiving content from a set-top box or a multimedia playback device, a component video connector, a composite video connector, a D-sub connector, and the like.

The reception path selector 123 selects a connector for receiving content among the above described connectors 121. For example, the reception path selector 123 may automatically select a connector 121 for receiving content or may manually select the connector 121 for receiving content according to a user's control command.

When the tuner 125, during reception of broadcast signals, extracts a transmission signal having a specific frequency (channel) among the signals received through the antenna. In other words, the tuner 125 may select a channel (or frequency) for receiving content according to a user's channel selection command.

Referring to FIG. 4, the display apparatus 1 may be provided with the image processor 130. The image processor 130 may process the image content among various types of contents received by the content receiver 120 and provide the display device 140 with the processed image data.

In this case, as illustrated in FIG. 4, the image processor 130 may include a graphic processor 131 and a graphic memory 133. The graphic processor 131 and the graphic memory 133 may be implemented as single chips. However, there is no limitation in implementing the graphic processor 131 and the graphic memory 133, for example, the graphic processor 131 and the graphic memory 133 may be integrated into a single chip.

The graphic processor 131 may process image data memorized in the graphic memory 133 according to an image processing program memorized in the graphic memory 133. In addition, the graphic memory 133 may memorize an image processing program and image processing information for image processing, or may temporarily memorize image information output from the graphic processor 131 or image information received from the content receiver 120

Referring to FIG. 4, the display apparatus 1 may be provided with the display device 140. The display device 140 may include a display 20 for visually displaying an image and a display driver 141 for driving the display 20.

The display 20 may include a pixel that serves a unit for displaying an image. Each pixel may receive an electrical signal representing image data and output an optical signal corresponding to the received electrical signal. As such, optical signals output by a plurality of pixels included in the display 20 are combined to display one image on the display 20.

In addition, the display 20 may be classified into various types according to a method of outputting an optical signal by each pixel. For example, the display 20 may be classified into an emissive display that emits light by a pixel itself, a transmissive display that blocks or transmits light emitted from a backlight, and a reflective display that reflects or absorbs light incident from an external light source.

The display 20 may include a cathode ray tube (CRT) display panel, a liquid crystal display (LCD) panel, a light emitting diode (LED) panel, and an organic light emitting diode (OLED) panel, a plasma display panel (PDPs), a field emission display (FED) panel, and the like, but the disclosure is not limited thereto.

The display 20 is not limited thereto and may employ various display methods capable of visually displaying an image corresponding to image data. A display panel may be referred to as a display as an abbreviation.

The display driver 141 may receive image data from the image processor 130 according to a control signal of the controller 190 and drive the display 20 to display an image corresponding to the received data. Detailed description of the controller 190 will be described below.

In addition, the sound output unit 150 may be provided in the display apparatus 1.

The sound output unit 150 may receive sound information from the content receiver 120 according to a control signal of the controller 190 and output sound. In this case, the sound output unit 150 may include one or more speakers 151 for converting an electrical signal into a sound signal.

In addition, an infrared ray receiver 160 may be provided in the display apparatus 1.

The infrared ray receiver 160 may receive an infrared signal. For example, an infrared ray emitter may be provided in the remote controller. When the remote controller receives a control command from the user, the remote controller may convert the received control command into an infrared signal through the infrared ray emitter and transmit the infrared signal. Accordingly, the infrared ray receiver 160 may receive the infrared signal and identify the control command from the received infrared signal. Here, the infrared ray receiver 160 may be implemented through various methods generally known to those skilled in the art, without limitation.

On the other hand, the display apparatus 1 may be provided with a communicator 170 as shown in FIG. 4. The communicator 170 may include a wireless communication module 171 for supporting a wireless communication method and a wired communication module 174 for supporting a wired communication method, and may support various communication methods.

The communicator 170 may communicate with an intermediate server and another electronic apparatus. Data transmitted and received between the communicator 170 and the intermediate server and other electronic apparatuses may include general data for controlling each apparatus and an encryption key of each electronic apparatus.

The communication method includes a wireless communication method and a wired communication method. Here, the wireless communication method refers to a communication method capable of transmitting and receiving a signal including data wirelessly. In this case, the wireless communication method may include 3 Generation (3G), 4 Generation (4G), Wireless LAN, Wi-Fi, Bluetooth, Zigbee, Wi-Fi Direct (WFD), Ultra-wideband (UWB) Infrared Data Association (IrDA), Bluetooth Low Energy (BLE), Near Field Communication (NFC), Z-Wave (Z-Wave), and other various communication methods, but is not limited thereto.

In addition, the wired communication method refers to a communication method in which a signal including data is transmitted and received in a wired manner. For example, a wired communication method may include a peripheral component interconnect (PCI), a PCI-express, a universal serial bus (USB), and the like, but is not limited thereto.

For example, the communicator 170 may transmit and receive a wireless signal to and from the IoT device through a base station by a communication method, such as 3G, 4G, and the like. In addition, the communicator 170 may transmit and receive a wireless signal including data with a device within a predetermined distance through wireless LAN, Wi-Fi, Bluetooth, Z-wave, Zigbee, Wi-Fi Direct (WFD), UWB, IrDA, BLE, NFC, and other various wireless communication methods.

Referring to FIG. 4, the wireless communication module 171 includes a Wi-Fi communication module 172 supporting a Wi-Fi communication method, and a Bluetooth communication module 173 supporting a Bluetooth communication method. In addition, the wired communication module 174 includes a USB communication module 175 supporting a USB communication method.

On the other hand, the communicator 170 may include one or more communication modules that support the above-described communication methods, and is not limited to the drawings in the specification. In this case, each communication module may be implemented as a single chip for each communication method. However, the communicator 170 is not limited thereto, and a plurality of communication modules may be integrated into a single chip.

In addition, a power supply 180 may be provided in the display apparatus 1 as shown in FIG. 4.

The power supply 180 supplies power to each component of the display apparatus 1 such that the display apparatus 1 is driven. The power supply 180 may supply power required for driving each component to activate the display apparatus 1.

Meanwhile, the power supply 180 may supply standby power to some of the components of the display apparatus 1. Here, standby power refer to power consumed by devices even when the power is turned off. In other words, standby power refers to electrical energy supplied to devices only when a device is plugged into an outlet regardless of the operation of the device.

Standby power varies by countries, and devices. For example, the standby power of the display apparatus 1 may be 0.5 W, the standby power of the dishwasher may be 0.5 W, and the standby power of the electric rice cooker may be 2 W. As such, the standards of the standby power may be set by devices and countries.

Even when the main power of the display apparatus 1 is in the OFF state, the power supply 180 may supply standby power to some components of the display apparatus 1 to always activate the components.

For example, the power supply 180 may activate the infrared ray receiver 160 through standby power. Accordingly, even when the display apparatus 1 is in an off state, that is, in an inactive state, the infrared ray receiver 160 may receive an infrared signal transmitted from the remote controller and turns on the power of the display apparatus 1.

Meanwhile, the controller 190 may be provided in the display apparatus 1.

The controller 190 may control such that a network with the other electronic apparatus is formed by transmitting an encryption key to the other electronic apparatus through the intermediate server.

In detail, the controller 190 may store the intermediate encryption key in advance in the memory 193. In transmitting an encryption key generated by the controller 190 to another electronic apparatus, the controller 190 may encrypt the encryption key using the previously stored intermediate encryption key and transmit the encryption key to the intermediate server.

In addition, the electronic apparatus may encrypt an encryption key generated by the electronic apparatus using the intermediate encryption key and transmit the encryption key to the intermediate apparatus. Since the intermediate server stores not only the intermediate encryption key but also an intermediate decryption key, the intermediate server may decrypt the encryption key received from the electronic apparatus and transmit the decrypted encryption key to the other electronic apparatus.

In the above-described method, the electronic apparatus and the other electronic apparatus may exchange the encryption keys generated by themselves. On the basis of the encryption keys, the electronic apparatus and the other electronic apparatus may form a network.

When both of the electronic apparatus and the other electronic device receive and sore the other party's encryption key, the controller 190 may determine that the respective electronic apparatus is a trusted electronic apparatus and form a network.

Meanwhile, after the network is formed, the other electronic apparatus may encrypt data using the encryption key and transmit the encrypted data to the electronic apparatus. The electronic apparatus may decrypt the received data using the decryption key and use the decrypted data.

Figure 5:
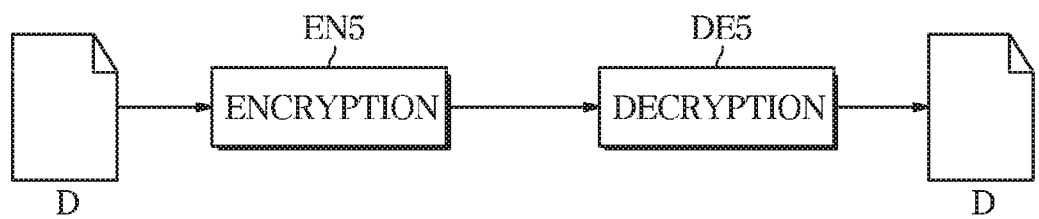
FIG. 5 is a diagram for describing an operation of an encryption process, according to an embodiment.

Referring to FIG. 5, the controller 190 includes a processor 191, a memory 193, and a microcomputer 195. Here, at least one of the processor 191, the memory 193, and the microcomputer 195 may be integrated into a system on chip (SOC) embedded in the display apparatus 1. However, since the display apparatus 1 may not only include a single SOC, the components of the controller 190 are not limited as being integrated into only a single SOC.

The memory 193 may memorize a control program and control data for controlling the operation of the display apparatus 1, and temporarily memorize a control command input through the input unit 110 or a control signal output from the processor 191.

The electronic apparatus may be provided such that the intermediate encryption key is stored in the memory 193 in the production stage of the electronic apparatus.

The memory 193 may be configured to store the encryption key and the decryption key generated by each of the electronic apparatus and the other electronic apparatus. In addition, the memory 193 may store the intermediate encryption key corresponding to the intermediate server in advance. In FIG. 4, the memory 193 is illustrated as being included in the controller 190, but the memory 193 may be implemented separately from the controller 190 without limitation as long as it can store data.

Meanwhile, a method of implementing a user interface, which will be described below, may be implemented as an algorithm or a program and stored in the memory 193. Accordingly, the processor 191 may generate a user interface using data stored in the memory 193.

Alternatively, the algorithm, program, and the like described above may be stored in an external apparatus. Accordingly, the processor 191 may receive data regarding a user interface derived by the external apparatus through the algorithm and the program through the communicator 170, and implement the data to be displayed on the display panel. That is, there is no limitation on implementing a user interface.

The processor 191 may control the overall operation of the display apparatus 1. For example, the processor 191 may generate a control signal for controlling the components of the display apparatus 1 to control the operation of each component.

In one embodiment, the processor 191 may control the communicator 170 through a control signal, to thereby transmit and receive a signal including data to and from an external apparatus. In another embodiment, the processor 191 transmits a control signal to the sound output unit 150 according to a sound control command received through the input unit 110 such that the volume of the sound output through the speaker 151 is adjusted. In another embodiment, the processor 191 may control the image processor 130 to perform image processing on image information received from the content receiver 120 and may control the display device 140 to display image-processed image data.

Meanwhile, the processor 191 may generate a user interface displayed through the display 20. In one embodiment, the processor 191 may include a graphic processor to implement the above-described graphic user interface that is displayed on the display 20.

The user interface refers to an environment configured to allow a user to more easily control components of an IoT device or and embedded programs, and to more easily identify information about the IoT device. Accordingly, the user interface allows the user to more easily control not only the display apparatus 1 but also the IoT device, and allows the user to more easily identity information about the display apparatus 1 and the IoT device.

The user interface described below may be a graphic user interface that graphically implements a screen displayed on the display 20 such that an interaction between a user and the electronic apparatus is more conveniently performed.

For example, the graphic user interface may be implemented such that some area of a screen displayed through the display 20 displays icons, buttons, and the like for easily receiving various control commands from a user and another area of the screen displays various pieces of information through at least one widget.

For example, the processor 191 may display, on the display 20, a user interface configured to provide various pieces of information through at least one widget. Here, the widget refers to a mini-application program, which is a graphic user interface for enhancing an interaction between a user and an application program providing various services. That is, the user may easily utilize various applications through the widget, and may easily identify various pieces of information.

In addition, the user interface may be divided into a plurality of areas, in some areas of which the widgets are arranged to display various pieces of information and in other areas of which an icon, a button, and other medium for receiving a control command or supporting a connection with an application are arranged. In this case, the size of each divided area may be variously set.

The processor 191 may implement a user interface that provides information and control of not only the display apparatus 1 but also the IoT device paired with the display apparatus 1, and display the user interface on the display panel.

Since various IoT devices exist indoors, when a user interface configured to provide information about all the paired IoT devices is displayed on the display 20, the user may have difficulty in identifying a certain one of the IoT devices on which an event has occurred. Accordingly, the processor 191 may implement a user interface to provide information and control of only the electronic device for which event information has been received, and may display the user interface. As such, the user interface may be variously implemented without limitation.

In other words, the processor 191 according to the embodiment provides a user with a user interface for inputting information about an IoT device on which an event has occurred and a control command, so that events simultaneously occurring in various IoT devices are more easily identified and control of the IoT devices are facilitated. On the other hand, detailed description of the implementation method of the user interface will be described below.

The microcomputer 195 may receive a power on/off signal and control power supplied to each component. In this case, the microcomputer 195 may include an interrupt port for receiving a power on/off signal. Accordingly, even in an operation-stop state, the microcomputer 195, upon receiving a power on signal through the interrupt port, may activate the processor 191 to activate the display apparatus 1 through the power supply 180. In other words, an input terminal of the power on/off signal is the interrupt port of the microcomputer 195.

For example, the power supply 180 may activate the infrared ray receiver 160 and the Bluetooth communication module 173 using standby power, so that the display apparatus 1 may operate even without receiving main power. Accordingly, the microcomputer 195, upon receiving a power-on signal from at least one of the infrared ray receiver 160 or the Bluetooth communication module 173, allow main power to the display apparatus 1.

In one embodiment, when the power of the display apparatus 1 is turned off, the user may click a power button attached to the remote controller. Then, the remote controller may request power-on of the display apparatus 1 through an infrared signal. Accordingly, the infrared ray receiver 160 may receive the infrared signal and input a power-on signal to the interrupt port of the microcomputer 195. The microcomputer 195 activates the processor 191 such that the display apparatus 1 is activated, that is, the power of the display apparatus 1 is turned on.

FIG. 5 is a diagram for describing an operation of an encryption process, according to an embodiment.

Since a network is basically an open system, an attacker may access arbitrarily the network, and data D is exposed to the external access. Thus, there is a need to protect data from attackers. In particular, the disclosure is to provide a security from an operation of reading data by an attacker.

In order to prevent an attacker or external intruder from perform a malicious activity, such as reading or modifying a message sent between a sender and a receiver, an encryption may be used.

Encryption EN5 may include transforming content of a message such that the original meaning of the message is not identified.

Since the meaning of the encryption EN5 is encoded in language, the content of the message needs to be converted and transmitted using an expression method that is decrypted only by the sender and the receiver such that the content of the message is not identified by an attacker. In order that the encrypted text is transformed into the original language for the receiver identifies the content, a decryption process is required.

FIG. 5 illustrates encryption EN5 and decryption DE5 functions in a process of transmitting a message. Text into which data D before encryption EN5 is encrypted in an arbitrary form is referred to ciphertext. The ciphertext may be obtained using a predetermined encryption key.

The encryption process EN5 may be performed before data D is transmitted by a transmitting electronic apparatus. The decryption process DE5 may be performed in a process of receiving ciphertext by a receiving electronic apparatus. The encryption and decryption process are performed using keys including an encryption key and a decryption key. Therefore, the key values need to be secured against attackers other than the transmitting and receiving electronic apparatus. In this regard, a conventional operation performed by an attacker is described with reference to FIG. 6.

Figure 6:
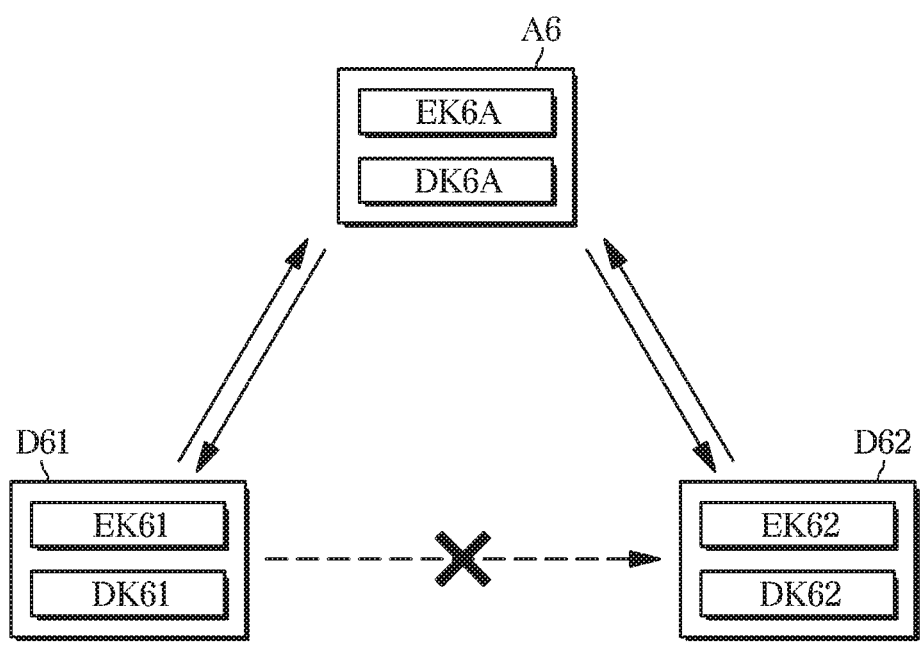
FIGS. 6, 7, and 8 are flowcharts for describing an operation of a network system in which an encryption key is transmitted and received between electronic apparatuses according to an embodiment.

FIG. 6 is a view for describing the attacking operation of the attacker.

Referring to FIG. 6, an attacker A6 is positioned between a first electronic apparatus D61 and a second electronic apparatus D62 and manipulates data encrypted with an encryption key EK61 using a public key EK6A of the attacker A6 to acquire the data transmitted by the first electronic apparatus D61. That is, the attacker may transmit, to the second electronic apparatus D62, data encrypted with the encryption key EK6A of the attacker rather than the data transmitted by the first electronic apparatus D61. The second electronic apparatus D62 may encrypt data using the encryption key EK6A received from the attacker and transmit the encrypted data. The attacker may decrypt the data transmitted by the second electronic apparatus D62 using a decryption key DK6A of the attacker and transmit the decrypted data to the first electronic apparatus D61.

The first electronic apparatus D61 and the second electronic apparatus D62 do not directly form a network, and have difficulty in determining the existence of an attacker because there is no limitation in transmitting and receiving content therebetween. Meanwhile, the attacker may identify the data transmitted by the second electronic apparatus D62. In this way, the attacker may identify the data transmitted and received between the first electronic apparatus D61 and the second electronic apparatus D62. The following is an operation according to the disclosure that may remove the above described limitation.

Figure 7:
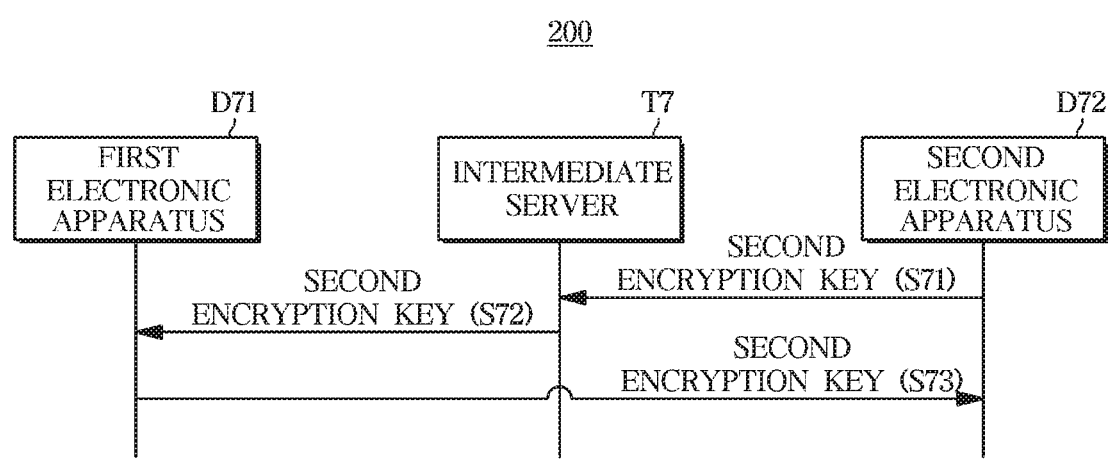
Figure 8:
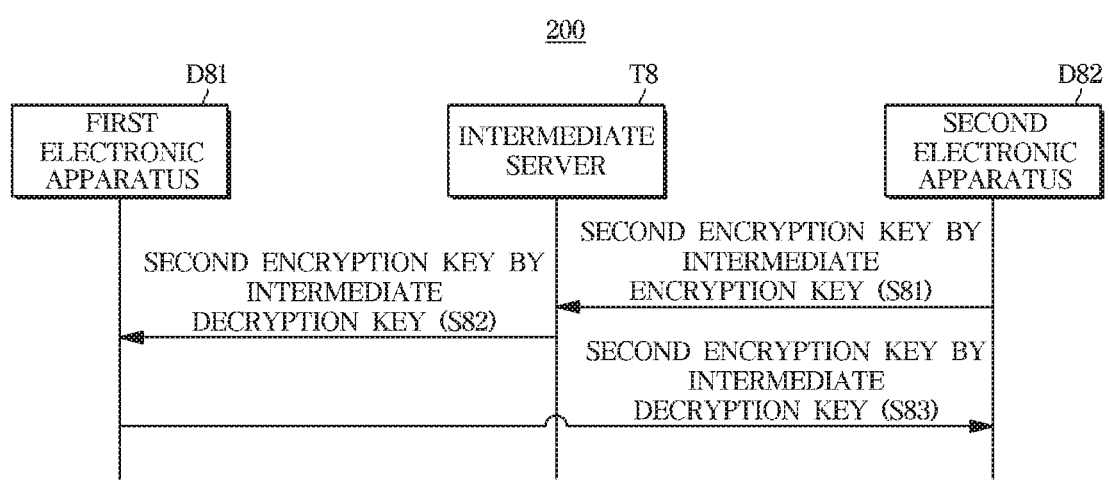

FIGS. 7 and 8 are flowcharts for describing an operation of a network system in which an encryption key is transmitted and received between electronic apparatuses according to an embodiment.

Referring to FIG. 7, a network system 200 may include a first electronic apparatus D71, a second electronic apparatus D72, and an intermediate server T7. When the first electronic apparatus D71 communicates with the second electronic apparatus D72, the second electronic apparatus D72 may transmit an encryption key generated by the second electronic apparatus D72 to the first electronic apparatus D71 (operation S71). In the transmitting of the encryption key, the second electronic apparatus D72 may transmit the encryption key through the intermediate server T7. The intermediate server T7 may receive the encryption key from the second electronic apparatus D72 and transmit the encryption key to the first electronic apparatus D71 (operation S72). In forming a network with the second electronic apparatus D72, the first electronic apparatus D71 uses a second encryption key, which is the encryption key received from the second electronic apparatus D72, so that the reliability of network formation with the first electronic apparatus D71 is ensured (operation S73). That is, when the first electronic apparatus D71 forms a direct network with the second electronic apparatus D72, the first electronic apparatus D71 may form a network on the basis of the second encryption key received from the second electronic apparatus D72. In addition, even in a process of the first electronic apparatus D71 transmitting data to the second electronic apparatus D72, the first electronic apparatus D71 may encrypt the data using the second encryption key received from the second electronic apparatus D72 and transmit the data to the second electronic apparatus D72.

According to an embodiment, as for the first electronic apparatus D71 and the second electronic apparatus D72, when the first electronic apparatus D71 opens a specific IP port, the second electronic apparatus D72 directly makes an access using the corresponding IP address and port number, so that a network is formed. When the first electronic apparatus D71 and the second electronic apparatus D72 are located in different internal networks, the network formation may be implemented using various methods, for example, a method connecting via a VPN server, a method of establishing a P2P connection using a STUN protocol (RFC5780), and a method of relaying a network packet using a TURN protocol (RFC5766).

FIG. 8 is a diagram for describing an operation including an operation of an intermediate server T8 encrypting an encryption key of a second electronic apparatus D82.

Referring to FIG. 8, similar to FIG. 7, a second electronic apparatus D82 may transmit an encryption key to an intermediate server T8. Since the second electronic apparatus D82 stores an intermediate encryption key, which is an encryption key of the intermediate server T8, in advance, the second electronic apparatus D82 may encrypt the encryption key with the intermediate encryption key and transmit the encrypted encryption key to the intermediate server T8 (operation S81). Since the intermediate server T81 includes an intermediate encryption key, which is an encryption key of the intermediate server T8, and a decryption key for decrypting the encryption key of the intermediate server T8, the intermediate server T8 may decrypt the encryption key received from the second electronic apparatus D82. The intermediate server T8 may decrypt the encryption key received from the second electronic apparatus D82 and transmit the decrypted encryption key of the second electronic apparatus D82 to the first electronic apparatus (operation S82). In the operations of FIG. 8, similar to FIG. 7, the first electronic apparatus D81 may form a network on the basis of the second encryption key received from the second electronic apparatus D82 (operation S83). In addition, even in a process of the first electronic apparatus D81 transmitting data to the second electronic apparatus D82, the first electronic apparatus D81 may encrypt the data using the second encryption key received from the second electronic apparatus D82 and transmit the encrypted data to the second electronic apparatus D82. Details thereof will be described below.

Figure 9:
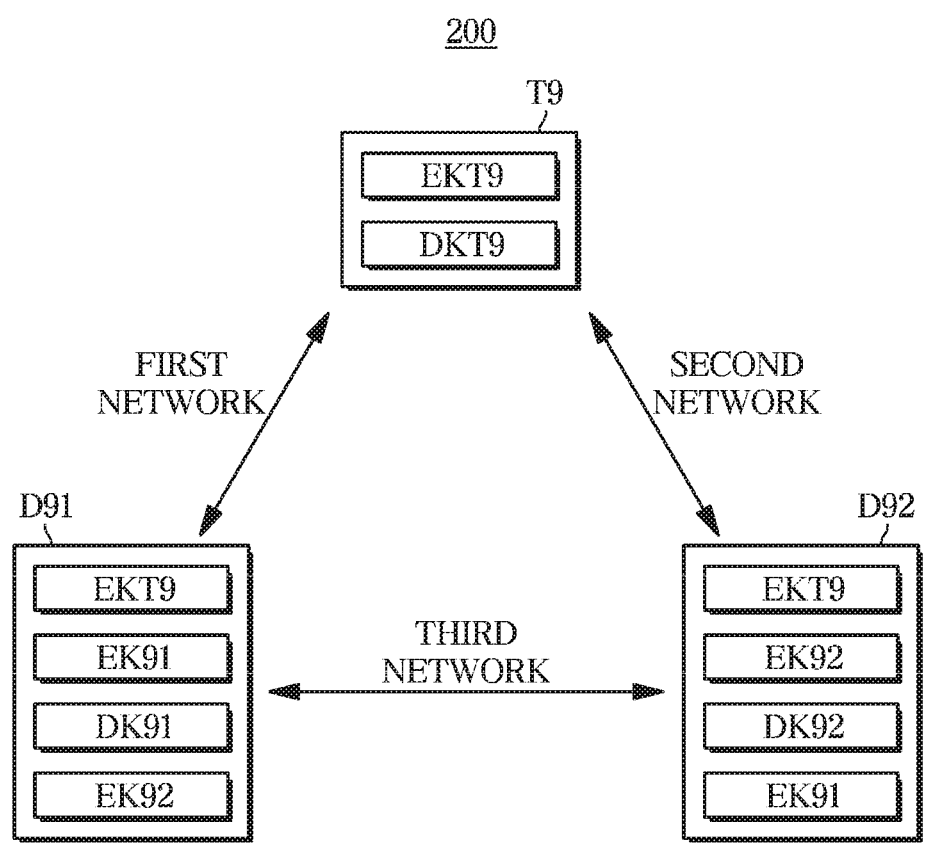
FIG. 9 is a diagram illustrating electronic apparatuses and an intermediate server for which networks are formed according to an embodiment.

FIG. 9 is a diagram illustrating an electronic apparatus and an intermediate server T9 for which networks are formed according to an embodiment.

FIG. 9 illustrates a state in which networks are formed on the basis of the operations shown in FIGS. 7 and 8.

In detail, a first electronic apparatus D91, a second electronic apparatus D92, and an intermediate server T9 previously store an intermediate encryption key EKT9 in common. Accordingly, the first electronic apparatus D91 and the second electronic apparatus D92 may exchange respective encryption keys EK91 and EK92 that are encrypted using the intermediate encryption key EKT9. When the transmission of the encryption keys EK91 and EK92 is completed, the first electronic apparatus D91 stores the second encryption key EK92 corresponding to the second electronic apparatus D92, and the second electronic apparatus D92 stores the first encryption key EK91 corresponding to the first electronic apparatus D91.

To summarize, the first electronic apparatus D91 and the second electronic apparatus D92 may store the intermediate encryption key EKT9 in advance, and when the encryption key exchange is completed, may each store the other party's encryption key. When transmitting the respective encryption keys thereof, the first electronic apparatus D91 and the second electronic apparatus D92 may transmit the encryption keys encrypted with the intermediate encryption key EKT9. Even if the attacker may obtain the intermediate encryption key EKT9, the attacker may not obtain the intermediate decryption key, and thus has difficulty in identifying the data and the encryption key transmitted by each electronic apparatus. In addition, since the attacker may not identify the decryption key of each electronic apparatus, the network formed by the electronic apparatuses may secure the safety from the attacker on the basis of the above-described operation.

Figure 10:
FIG. 10 is a diagram for describing an operation in which data is transmitted and received between electronic apparatuses according to an embodiment of the disclosure.

FIG. 10 is a diagram for describing an operation in which data is exchanged between electronic apparatuses according to an embodiment of the disclosure.

Similar to FIG. 9, when a first electronic apparatus D101 and a second electronic apparatus D102 exchange encryption keys between each other to form a network, the second electronic apparatus D102 may transmit data to the first electronic apparatus D101.

When transmitting data to the first electronic apparatus D101, the second electronic apparatus D102 may encrypt the data using the first encryption key (that is, the encryption key of the first electronic apparatus D101) received from the first electronic apparatus D101. Meanwhile, since the first electronic apparatus D101 stores the first encryption key and the first decryption key, the first electronic apparatus d101 may decrypt the data encrypted with the first encryption key with the first decryption key.

When data is transmitted and received in the above-described manner, even when an attacker obtains an encryption key, a decryption key stored in each electronic apparatus may not be obtained by the attacker, so that a robust network may be formed. Meanwhile, the above description made with reference to FIGS. 7 to 10 is merely an embodiment for securing the safety from attackers in forming a network between electronic apparatuses, and the operation of the disclosure is not limited thereto as long as it can prevent an attacker from obtaining a decryption key and identifying data on the network.

Figure 11:
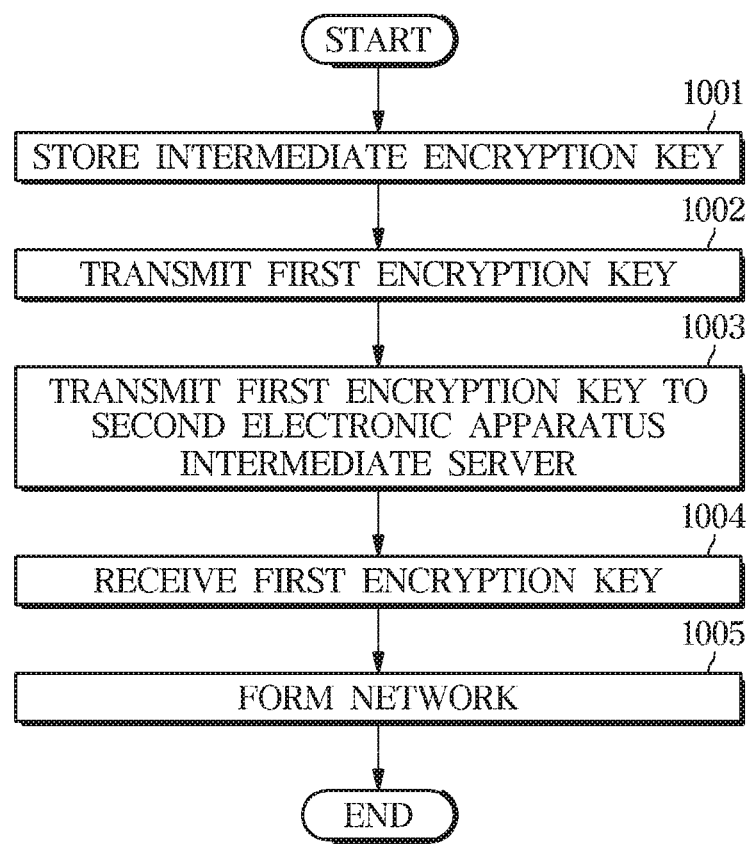
FIG. 11 is a flowchart according to an embodiment.

FIG. 11 is a flowchart according to an embodiment.

Referring to FIG. 11, a first electronic apparatus may store an intermediate encryption key of an intermediate server (operation 1001). The first electronic apparatus may transmit a first encryption key (that is, an encryption key of the first electronic apparatus) to the intermediate server (operation 1002). The first encryption key may be transmitted to a second electronic apparatus through the intermediate server (operation 1003). The second electronic apparatus may receive the first encryption key transmitted through the intermediate server (operation 1004), and form a network with the first electronic apparatus (operation 1005).

Figure 12:
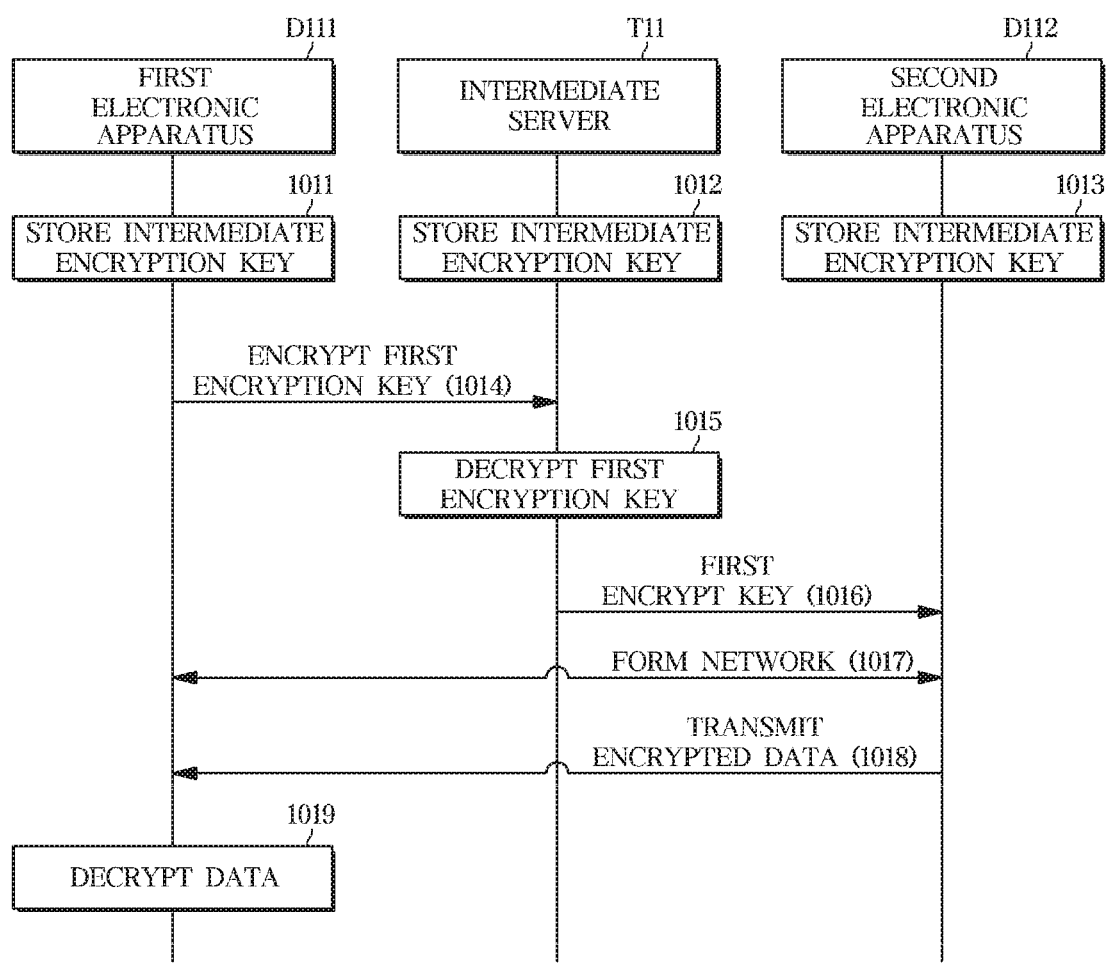
FIG. 12 is a flowchart showing an operation according to an embodiment.

FIG. 12 is a flowchart showing the operation of the disclosure.

Referring to FIG. 12, a first electronic apparatus D111, an intermediate server T11, and a second electronic apparatus D112 may store an intermediate encryption key in advance (operation 1011, 1012, and 1013). The first electronic apparatus may encrypt a first encryption key and transmit the encrypted first encryption key to the intermediate server (operation 1014). The previously stored intermediate encryption key may be used to encrypt the first encryption key. Since the intermediate server includes an intermediate decryption key, the intermediate server may decrypt the encrypted first encryption key received from the first electronic apparatus (operation 1015). The intermediate server may decrypt the encrypted first encryption key and transmit the decrypted first encryption key to the second electronic apparatus (operation 1016). The first electronic apparatus and the second electronic apparatus may form a network on the basis of the first encryption key (operation 1017). The second electronic apparatus may encrypt data using the first encryption key received from the first electronic apparatus and transmit the data to the first electronic apparatus (operation 1018), and since the first electronic apparatus stores a first decryption key, the first electronic apparatus may decrypt the data transmitted by the second electronic apparatus (operation 1019).

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random-Access Memory (RAM), a magnetic tape, a magnetic disk, a flash memory, an optical data storage device, and the like.

As is apparent from the above, the electronic apparatus, the method of controlling the same, and the network system thereof according to the disclosure can safely transmit and receive data by forming a network between electronic apparatuses through an intermediate server.

Although embodiments of the disclosure have been described for illustrative purposes, those skilled in the art will appreciate that various modifications, additions and substitutions are possible, without departing from the scope and spirit of the disclosure. Therefore, embodiments of the disclosure have not been described for limiting purposes.

What is claimed is:

1. An electronic apparatus comprising:
   a communication circuitry configured to communicate with an intermediate server and an other electronic apparatus;
   a memory which stores an intermediate encryption key corresponding to the intermediate server, and a first encryption key and a decryption key of the electronic apparatus that are generated by the electronic apparatus; and a controller configured to:
encrypt the first encryption key with the intermediate encryption key,
control the communication circuitry to transmit the first encryption key encrypted with the intermediate encryption key to the other electronic apparatus through the intermediate server,
in response to the transmitting the first encryption key, control the communication circuitry to receive, through the intermediate server, a second encryption key generated by the other electronic apparatus and the first encryption key transmitted from the intermediate server,
wherein the first encryption key transmitted from the intermediate server and the second encryption key are encrypted by the other electronic apparatus with the intermediate encryption key stored in advance in the other electronic apparatus,
wherein the first encryption key transmitted from the intermediate server and the second encryption key are decrypted by the intermediate server so that the communication circuitry receives the first encryption key transmitted from the intermediate server and the second encryption key in a decrypted state,
perform a control such that a network with the other electronic apparatus is formed based on at least the second encryption key decrypted by the intermediate server, and
determine whether there is an intermediate attacker by comparing the first encryption key transmitted from the intermediate server decrypted by the intermediate server with the generated first encryption key.

2. The electronic apparatus of claim 1, wherein
the controller is further configured to perform the control such that the network with the other electronic apparatus is formed based on the second encryption key generated by the other electronic apparatus and the first encryption key which was generated by the electronic apparatus and stored in the memory.

3. The electronic apparatus of claim 2, wherein the controller is further configured to store the second encryption key in the memory, encrypt data using the second encryption key, and transmit the encrypted data to the other electronic apparatus through the communication circuitry.

4. The electronic apparatus of claim 2, wherein the controller is further configured to control the communication circuitry to receive data encrypted using the first encryption key from the other electronic apparatus in which the transmitted first encryption key has been stored, and decrypt the encrypted data using the decryption key.

5. A method of controlling an electronic apparatus, the method comprising:
storing, in a memory of the electronic apparatus, an intermediate encryption key corresponding to an intermediate server, and a first encryption key and a decryption key that are generated by the electronic apparatus;
encrypting the first encryption key with the intermediate encryption key;
transmitting the first encryption key encrypted with the intermediate encryption key to an other electronic apparatus through the intermediate server;
in response to the transmitting the first encryption key, receiving, through the intermediate server, a second encryption key generated by the other electronic apparatus and the first encryption key transmitted from the intermediate server, wherein the first encryption key transmitted from the intermediate server and the second encryption key are encrypted by the other electronic apparatus with the intermediate encryption key stored in advance in the other electronic apparatus; and
wherein the first encryption key transmitted from the intermediate server and the second encryption key are decrypted by the intermediate server so that communication circuitry receives the first encryption key transmitted from the intermediate server and the second encryption key in a decrypted state,
performing a control such that a network with the other electronic apparatus is formed based on at least the second encryption key decrypted by the intermediate server, and
determining whether there is an intermediate attacker by comparing the first encryption key transmitted from the intermediate server decrypted by the intermediate server with the generated first encryption key.

6. The method of claim 5, wherein
the performing the control further comprises performing the control such that the network with the other electronic apparatus is formed by comparing the second encryption key generated by the other electronic apparatus with the first encryption key which was generated by the electronic apparatus and stored in the memory.

7. The method of claim 6, further comprising:
encrypting data using the second encryption key generated by the other electronic apparatus, and
transmitting the encrypted data to the other electronic apparatus through the communication circuitry.

8. The method of claim 6, further comprising:
receiving data encrypted using the first encryption key generated by the electronic apparatus from the other electronic apparatus; and
decrypting the encrypted data using the decryption key.

9. A network system comprising:
an intermediate server;
a first electronic apparatus in which an intermediate encryption key corresponding to the intermediate server is stored; and
a second electronic apparatus in which the intermediate encryption key is stored, and which is configured to:
encrypt a second encryption key generated by the second electronic apparatus with the intermediate encryption key, and
transmit the second encryption key and a first encryption key encrypted with the intermediate encryption key to the first electronic apparatus through the intermediate server, wherein the first encryption key is previously generated by the first electronic apparatus and transmitted, by the first electronic apparatus, to the second electronic apparatus through the intermediate server,
wherein the first electronic apparatus is further configured to:
receive the second encryption key, wherein the first encryption key transmitted from the intermediate server and the second encryption key are encrypted by the second electronic apparatus with the intermediate encryption key stored in advance in the second electronic apparatus,
wherein the first encryption key transmitted from the intermediate server and the second encryption key are decrypted by the intermediate server so that communication circuitry receives the first encryption key transmitted from the intermediate server and the second encryption key in a decrypted state, perform a control such that a network with the second electronic apparatus is formed based on at least the second encryption key decrypted by the intermediate server, and determine whether there is an intermediate attacker by comparing the first encryption key transmitted from the intermediate server decrypted by the intermediate server with the generated first encryption key.

10. The network system of claim 9, wherein the second electronic apparatus forms the network with the first electronic apparatus based on receiving the first encryption key generated by the first electronic apparatus.

11. The network system of claim 9, wherein the first electronic apparatus encrypts data using the second encryption key generated by the second electronic apparatus and transmits the encrypted data to the second electronic apparatus.

12. The network system of claim 11, wherein the second electronic apparatus decrypts the encrypted data using a decryption key.

* * * * *